United States Patent [19]

Peoples, Jr. et al.

[11] Patent Number: 4,579,764
[45] Date of Patent: Apr. 1, 1986

[54] MOLDED CARPET ASSEMBLY WITH SOUND DEADENING FOAM BACKING

[75] Inventors: Clarence A. Peoples, Jr., Rockwell, N.C.; Jacquelyn S. Hicks, Cohutta, Ga.; Vernon C. Smith, Huntersville, N.C.

[73] Assignee: Collins & Aikman Corporation, New York, N.Y.

[21] Appl. No.: 755,307

[22] Filed: Jul. 15, 1985

Related U.S. Application Data

[63] Continuation-in-part of Ser. No. 625,224, Jun. 27, 1984, Pat. No. 4,529,639.

[51] Int. Cl.$^4$ .................. B29D 31/00; B32B 33/00
[52] U.S. Cl. ................................ 428/95; 264/243; 264/257; 428/159; 428/160
[58] Field of Search .................. 264/257, 243, 45.1; 428/95, 159, 160

[56] References Cited

U.S. PATENT DOCUMENTS

| | | | |
|---|---|---|---|
| 3,616,138 | 11/1971 | Wentworth | 428/95 |
| 4,016,318 | 4/1977 | DiGioia et al. | 428/95 |
| 4,078,100 | 3/1978 | Doerfling | 427/314 |
| 4,096,303 | 6/1978 | Doerfling | 428/91 |
| 4,186,230 | 1/1980 | Sinclair et al. | 428/95 |
| 4,199,634 | 4/1980 | Pole et al. | 428/95 |
| 4,230,755 | 10/1980 | Morris | 428/95 |
| 4,382,986 | 5/1983 | Reuben | 428/95 |
| 4,529,639 | 7/1985 | Peoples et al. | 428/95 |

FOREIGN PATENT DOCUMENTS

| | | |
|---|---|---|
| 28715 | 5/1981 | European Pat. Off. . |
| 2319431 | 10/1973 | Fed. Rep. of Germany . |
| 2063588 | 2/1974 | Fed. Rep. of Germany . |
| 2706446 | 3/1977 | Fed. Rep. of Germany . |
| 7836660 | 12/1978 | Fed. Rep. of Germany . |
| 2924197 | 12/1980 | Fed. Rep. of Germany . |
| 3034799 | 4/1982 | Fed. Rep. of Germany . |
| 7604210 | 9/1976 | France . |
| 7737745 | 7/1978 | France . |
| 59-001230 | 1/1984 | Japan . |
| 2138012A | 10/1984 | United Kingdom . |

*Primary Examiner*—Marion E. McCamish
*Attorney, Agent, or Firm*—Bell, Seltzer, Park & Gibson

[57] ABSTRACT

A molded foam-backed carpet assembly is provided which is suitable for use in automobiles and which includes a carpet layer, a moldable thermoplastic polymer layer and a sound deadening foam cushion bonded to the thermoplastic polymer layer. The physical properties of the foam are controlled to provide enhanced vibration damping and sound deadening in the carpet assembly.

20 Claims, 7 Drawing Figures

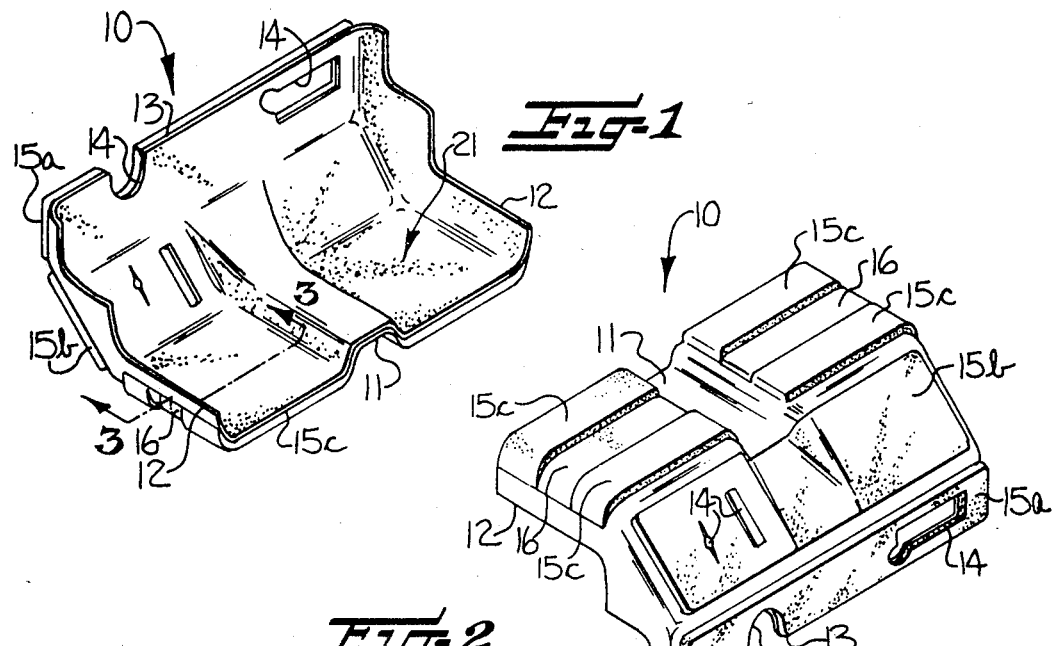
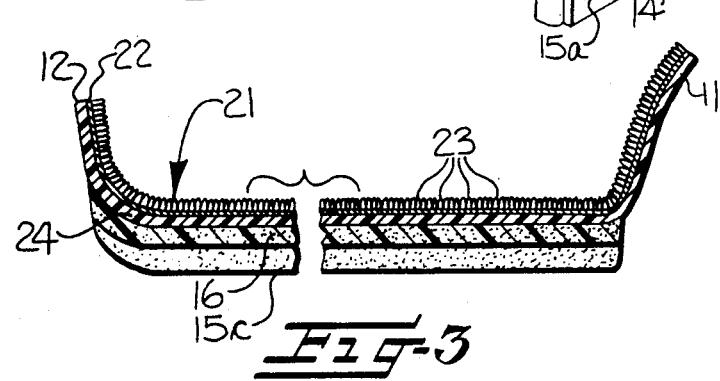
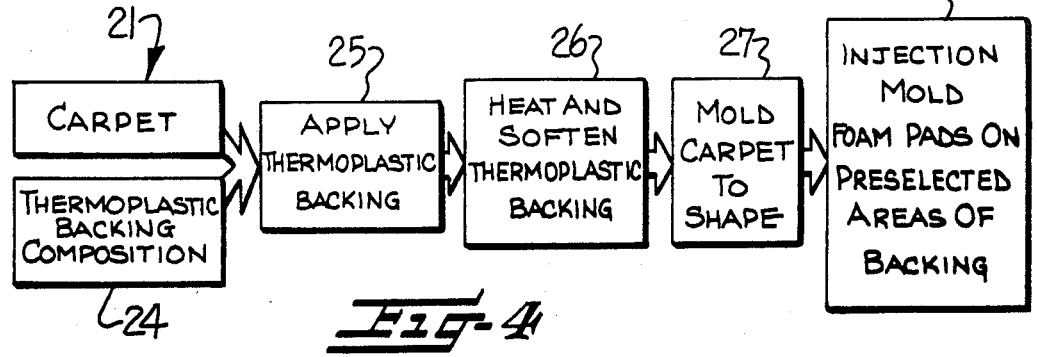

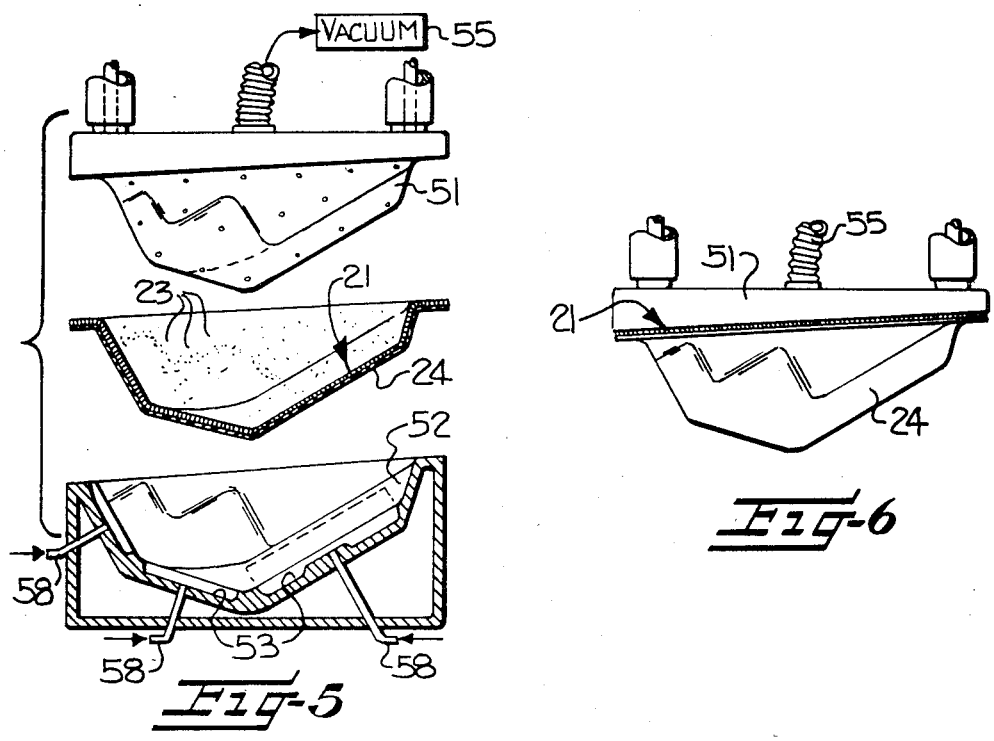
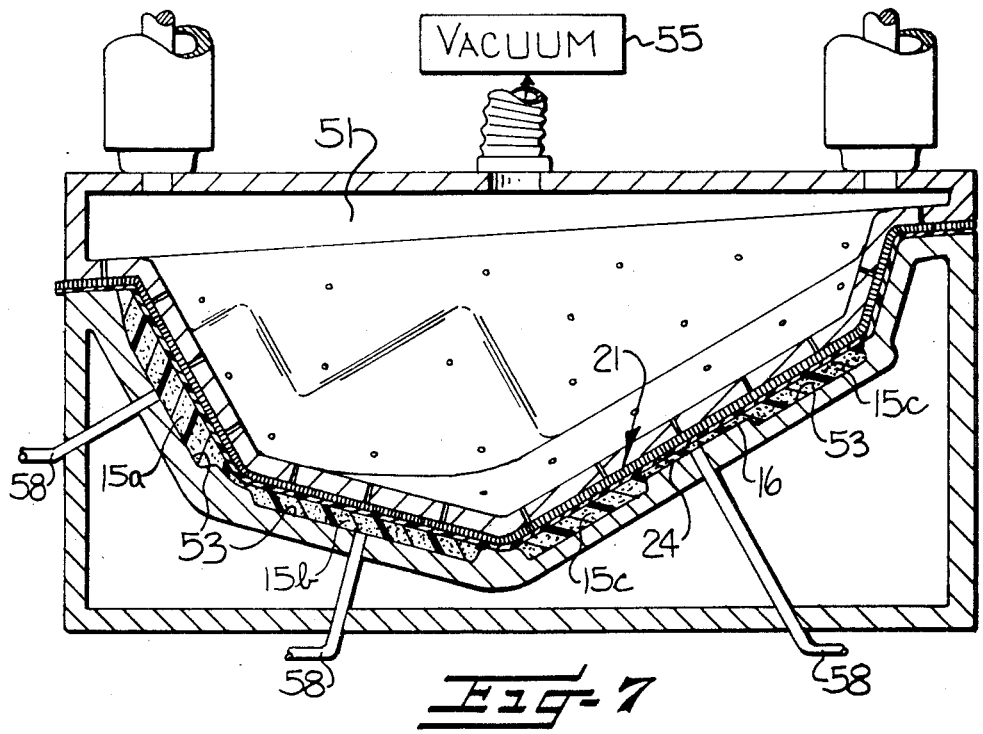

MOLDED CARPET ASSEMBLY WITH SOUND DEADENING FOAM BACKING

CROSS REFERENCE TO RELATED APPLICATION

This application is a continuation-in-part of commonly-owned copending application Ser. No. 625,224 filed June 27, 1984, now U.S. Pat. No. 4,529,639 issued July 16, 1985, and claims the benefit of the earlier filing date thereof under 35 U.S.C. 120.

FIELD AND BACKGROUND OF THE INVENTION

This invention relates to a molded carpet assembly suitable for use in automobiles. The carpeting used to cover the floor areas of automobiles is conventionally molded into a nonplanar three dimensional contoured configuration which conforms to the contours of the automobile floor so as to fit properly, for example, over the transmission hump on the floor of the automobile. In order to make the carpeting moldable and shape sustaining, it is conventionally provided with a backing or coating of a thermoplastic polymer composition. The thermoplastic polymer backing may contain substantial amounts of inorganic fillers to improve the sound deadening properties of the carpet assembly. Additionally, the automotive carpets are normally provided with padding on the rear surface for cushioning, sound deadening, and thermal insulation. The pads are commonly formed from relatively inexpensive fibers such as jute or recycled waste fibers, and they are precut into predetermined desired shapes and bonded to the back coated surface of the molded carpet.

In the production of this type of molded carpet assembly, a number of difficulties have been encountered. The fiber pads often vary in size and thickness, which results in nonuniformity of the resulting product. This construction requires manual placement and assembly of the pads which, in addition to the labor costs involved, often results in variations in placement of the pads on the carpet backing, which further contributes to a nonuniform product and results in a poor fit when the carpet assembly is later installed in the automobile. Difficulties are also encountered in obtaining good adherence between the fiber waste pads and the carpet backing. As a result, the pads may have a tendency to become detached during subsequent handling or installation.

The aforementioned commonly-owned copending application provides an improved molded carpet assembly which avoids the necessity of using precut fiber pads which must be properly placed and secured to the carpet backing, and instead provides foam pads which are formed in situ at the desired locations on the back of the molded carpet assembly. This type of carpet assembly provides significant advantages over the fiber pad backed carpets of the prior art. For example, it is possible to achieve much more precise control over the thickness, size and placement of the foam pads and to thereby obtain a better fit and conformance of the carpet assembly to the floor of the automobile.

The present invention provides further improvements in a molded foam-backed carpet assembly of the general type disclosed and claimed in the aforementioned copending application. More particularly, in accordance with the present invention there is provided a molded foam-backed automobile carpet assembly which is designed to provide enhanced sound deadening properties to the carpet assembly. It has been found that through careful selection and control over the characteristics of the foam backing, the vibration damping characteristics and hence the overall acoustical sound deadening properties of the carpet assembly can be significantly improved.

Furthermore, the present invention provides an improved foam-backed carpet assembly having excellent acoustical properties with minimum weight. Prior to the present invention, the prevalent understanding was that it is necessary to increase the mass of the sound insulation in order to achieve better acoustics, and typically the efforts to enhance the acoustical properties of automotive carpets have involved increasing the mass. For this purpose, a highly filled thermoplastic polymer "mass backing" layer is conventionally provided in automotive carpet assemblies. In accordance with the present invention, it has been found that through appropriate selection and control over the properties of the foam backing and of the thermoplastic polymer layer, it is possible to achieve comparable or even better acoustical properties with a reduction in overall weight.

To use foam as a pad or cushion on the back of molded automotive carpets has been previously proposed, as taught for example in various prior patents such as U.S. Pat. Nos. 4,016,318; 4,078,100, 4,186,230; 4,230,755; and DE No. 2924197, and JA No. 59/001230. However, these prior patents do not address the acoustical properties of the carpet, nor do they recognize or teach how the acoustical properties may be improved through control over the physical properties of the foam. Published U.K. patent application GB No. 2,138,012 proposes using as a sound insulation layer in an automotive carpet a polyurethane foam which has been specially formulated so as to have viscoelastic properties. Although viscoelastic foam may perform acceptably for sound insulating purposes, its lack of resilience and other physical properties make it undesirable for use as a cushioning layer under a carpet. Also, viscoelastic foams, by nature, are highly temperature dependent and therefore perform poorly under the widely varying temperature conditions encountered in an automobile.

SUMMARY OF THE INVENTION

In its broad aspects, the present invention provides a molded foam-backed carpet assembly which is suitable for use in automobiles and which is characterized by having enhanced vibration damping properties. The carpet assembly comprises a carpet having a fibrous surface on one face thereof and having a nonplanar three dimensional contoured configuration adapted to conform to the contours of the floor of an automobile; a moldable thermoplastic polymer layer covering the opposite face of said carpet and imparting moldability to the carpet for maintaining the carpet in said nonplanar three dimensional contoured configuration; and a resilient flexible foam cushion foamed in placed on the thermoplastic polymer layer and bonded thereto.

The enhanced vibration damping and sound deadening properties of the carpet assemblies in accordance with the present invention are achieved by selection and control over certain physical properties of the foam cushion, including the softness and density of the foam. More particularly, the flexible foam cushion should be resilient and have a density of about 3 to 10 pounds per cubic foot and a softness, expressed in terms of 25% indentation force deflection (ASTM D3574 Test B), of no more than about 70 pounds. The foam cushion provides vibration damping properties to the carpet assembly of a magnitude such that a 20 mm thickness of such foam imparts to the carpet assembly a sound decay rate at 160 HZ of at least 175 dB/second. Preferably, the resilience of the foam is within the range of 25 to 75 percent (ASTM D3574 Test H) and the indentation force deflection within the range of 20 to 50 pounds; and most desirably the resilience is about 35 to 65 percent.

A particularly significant feature of the invention for automotive applications is the ability to provide reduction in weight in the carpet assembly while maintaining acceptable or improved acoustical properties. Because of the controlled density, resilience and softness properties of the foam cushion and the enhanced vibration damping properties provided thereby, we have found that it is possible to reduce the thickness and/or weight of the moldable thermoplastic polymer layer and thereby reduce the overall weight of the carpet assembly. In a preferred embodiment, the carpet assembly may have a weight of not more than about 1.1 pounds per square foot.

The flexible foam cushion is preferably a polyurethane foam of predominantly open cell structure and it is foamed in place by the reaction injection molding (RIM) method and is autogenously bonded to the thermoplastic polymer layer.

In order to reduce weight and provide a better fit and conformity while providing the desired padding, cushioning and sound deadening were most needed, the foam cushion may be provided only in localized preselected areas of the carpet which extend over less than the entire surface of the thermoplastic polymer layer.

BRIEF DESCRIPTION OF THE DRAWINGS

Some of the features and advantages of the invention having been described, others will become apparent from the detailed description which follows, when taken in connection with the accompanying drawings, in which—

FIG. 1 is perspective view showing a molded carpet assembly in accordance with the present invention;

FIG. 2 is perspective view showing the underside thereof;

FIG. 3 is an enlarged cross sectional view of the carpet assembly taken substantially along the line 3—3 of FIG. 1;

FIG. 4 is a block schematic diagram illustrating the process for producing the molded carpet assembly in accordance with the present invention;

FIG. 5 is a somewhat schematic exploded side cross sectional view showing a mold assembly which may be used for forming foam pads in accordance with the invention;

FIG. 6 is a side view of the mold assembly of FIG. 5 in the closed position; and FIG. 7 is an enlarged side cross sectional view of the mold assembly of FIG. 6.

DETAILED DESCRIPTION OF THE INVENTION

While the present invention will be described more fully hereinafter with reference to the accompanying drawings, in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now specifically to FIG. 1, reference character 10 generally indicates an automotive carpet assembly in accordance with the invention. The carpet assembly 10 illustrated in FIG. 1 has a nonplanar three dimensional molded configuration adapted to fit in the front seat compartment of an automobile and includes a raised medial portion 11 adapted to conform to the transmission hump, generally vertically extending side portions 12 adapted to fit beneath the door opening, and a front portion 13 adapted to fit along the inclined floorboard and vertical firewall areas of the automobile. Various openings or cut-outs are provided, as indicated at 14, to receive air conditioning equipment, the steering column, pedals and the like. It is to be understood that the particular three dimensional configuration illustrated is merely for purposes of illustration, and the actual configuration may vary quite significantly from that shown depending on the automobile body style.

The underside of the carpet assembly 10 is shown in FIG. 2. As illustrated, foam pads or cushions 15a, 15b, 15c extend over selected portions of the carpet assembly. More specifically, it will be seen that in the specific embodiment illustrated, the foam pads extend over less than the entire rear surface of the carpet assembly and the foam pads differ in thickness, not only from one pad to another but also vary in thickness within a given pad. For automotive applications the thickness may range from a minimum of about 5 mm to as much as 70 mm, and more typically from about 10 mm to about 30 mm. In the embodiment illustrated, it will be seen that pad 15a located in the vertically extending firewall area 13 is relatively thick to provide added thermal and sound insulation in this area. Pad 15b in the angular inclined footrest area is of intermediate thickness. The pads 15c in the horizontal floor area have a thickness which tapers in the side portions 12 to form a gradual transition in thickness so as to fit snugly beneath the door molding. Also the pads 15c are shown with a widthwise extending step thickness change in the form of a reduced thickness area indicated at 16, to conform to and receive a corresponding reinforcing rib on the automobile floorboard and provide a smooth finished surface to the installed carpet assembly.

FIG. 3 shows the carpet assembly in greater detail. As illustrated, it includes a carpet 21, which may suitably be of tufted, woven, knitted, or nonwoven construction in accordance with known methods of carpet manufacture. The carpet 21 as illustrated is of a conventional tufted construction and includes a backing 22 and pile yarns 23 which are secured to the backing 22 and extend therefrom to form a pile surface on the front of the carpet. The backing 22 is typically of a woven or nonwoven construction, depending upon the particular type of carpet construction. The pile yarns may be of any suitable composition, typically polyester, polypropylene, or nylon. In order to more securely adhere and lock the pile yarns 23 into the backing 22, the carpet may include a suitable binder coating (not shown), as is conventional in the manufacture of tufted carpets.

On the rear surface of the carpet backing 22 there is provided a coating or layer 24 of a thermoplastic polymer composition. The thermoplastic polymer layer 24 is adhered firmly to the backing 22, extends substantially over the entire surface thereof, and may be present at a level of about 0.1 to 1.0 pounds per square foot. The thermoplastic polymer layer 24 serves several functions. A primary function is to impart stiffness and moldability to the carpet so that the carpet can be molded into a desired three dimensional contoured configuration conforming to the contours of the floor of the automobile, and to impart shape retentive characteristics to the molded carpet so that it will maintain this three dimensional configuration during subsequent assembly and installation in the automobile and throughout its useful life. Another important function of the thermoplastic layer 24 is to form an impermeable barrier so that during the formation of the foam layer, the foam does not penetrate through the backing to the pile surface. The thermoplastic layer 24 also serves to impart sound deadening properties so as to thereby make the interior of the automobile more quiet. To this end, the thermoplastic composition may contain substantial proportions of filler materials such as calcium carbonate, gypsum, barium sulfate, etc. The filler content may, for example, be as high as about 80% by weight. Various polymers or copolymers may be suitably employed as the thermoplastic polymer such as, for example, polymers or copolymers of ethylene with ethylenically unsaturated monomers; blends of such polymers and copolymers with other processing aids or adjuvants such as processing oils, plasticizers and the like; polyolefin polymers such as polyethylene or polypropylene; polyvinyl chloride; styrenebutadine mixed polymers and mixtures of these materials with other thermoplastic polymers. Specific examples of filled thermoplastic compositions designed for use as a sound deadening backing layer on automotive carpets are disclosed in U.S. Pat. Nos. 4,191,798, 4,242,395, 4,379,190, and 4,403,007. The thermoplastic polymer layer 24 may be applied to the back of the carpet by suitable methods such as extrusion coating, calendering, or lamination, for example.

The foam pads 15a, 15b, 15c are bonded to the thermoplastic polymer layer 24 and provide desired cushioning properties, as well as thermal and sound insulation to the carpet assembly 10. The pads 15 are formed of a foam material, preferably a polyurethane foam. As explained more fully hereinafter, the polyurethane foam pads are formed in situ on preselected areas of the backing by the reaction injection molding (RIM) method. This results in the pads being permanently autogeneously bonded to the thermoplastic foam layer without the necessity of additional adhesives. The thus formed pads are also characterized by having a predominantly open cell structure with a skin on the exposed pad surfaces. Optionally, the foam composition may be loaded with fillers, glass beads, fibers or the like in order to vary the weight and density properties of the foam for optimum acoustical and cushioning properties.

A preferred method of producing the molded carpet assembly 10 is illustrated schematically in FIG. 4. As shown, the thermoplastic backing composition is applied to the back of the carpet in a suitable manner, indicated at 25, such as by extrusion coating or calendering. The thus coated carpet is then subjected to a molding operation where it is molded into a desired predetermined configuration. Typically, the molding operation includes heating a piece of the thermoplastic backed carpet to a temperature sufficiently high to soften the thermoplastic backing layer, as indicated at 26, and then placing the heated carpet between a pair of cooperating mold dies and applying pressure to the heated carpet within the mold dies in order to form it into the desired three dimensional configuration, as indicated at 27. After the carpet has cooled sufficiently to retain its shape, the mold dies are opened and the molded carpet is removed from the molds.

The thus molded coated carpet is then subjected to a second molding operation, indicated at 28, in which foam pads are formed in situ on preselected areas of the thermoplastic polymer back coating.

Preferably, a mold is provided which has a three dimensional configuration generally similar to that of the first mold which was used to shape the carpet. However, this mold includes recessed areas or wells of a size and depth which correspond to the foam pads to be formed. The foamable polyurethane composition is placed or injected in the wells, and the mold dies are brought together to enclose the molded carpet while the foamable composition foams, expands, and hardens to form foam pads in situ on preselected areas of the backing.

As illustrated more specifically in FIGS. 5 to 7, the apparatus for carrying out the foam pad molding step includes a cooperating upper mold 51 and lower mold 52. The recessed areas or wells in the lower mold 52 are indicated at 53. The upper mold 51 is preferably provided with suction means 55 which serves to hold the molded carpet in place on the upper mold until the mold halves are closed. A suitable amount of the foamable composition may be manually placed in the wells 53 prior to closing the mold halves. Alternatively, and as illustrated, injector nozzles, as indicated at 58 may be provided in association with each of the wells 53 for injecting a measured amount of the foamable composition into the well. In this instance, the mold halves may be suitably closed prior to injection of the foamable composition.

The foamable composition expands to fill the wells 53 and hardens and cures to form resilient flexible foam pads of the desired shape and density fusibly bonded to the exposed thermoplastic backing layer. To facilitate release of the in situ molded pads from the mold, the molds may be coated with a suitable mold release composition prior to introduction of the foamable composition. Alternatively, a thin film may be draped over the mold and utilized as a release layer, with the film becoming bonded to the in-situ formed pad.

By providing foamable compositions of differing formulations in different wells or in different areas of the same well it is possible to vary the density, flexibility, softness, and other properties of the foam pad from one pad to another or within different areas of the same pad. The formulation of the foamable composition may be selected by those skilled in the art to achieve the particular physical properties (e.g., softness, resilience, density, vibration damping properties) desired in the final product as described herein. Two part foamable polyurethane compositions have been suitably employed to form the form. For example, a suitable soft low density (3 to 5 pounds per cubic foot) polyurethane foam for use in this invention may be produced from a mixture of about 75 percent of a polyol and 25 percent isocyanate (preferably all MDI but suitably a MDI/TDI blend), with the polyol containing auxiliary chemicals such as fluorocarbons, water, catalysts, surfactants and fillers.

Concerning the physical properties of the foam, it is important that the foam be a flexible, resilient foam. Preferably, the resilience should be at least 25 percent, desirably 25 to 75 percent, and most desirably 35 to 65 percent. The softness of the foam (expressed in terms of the 25% indentation force deflection) should be no tion were produced and their sound deadening properties were measured and compared to controls not in accordance with the invention. In each instance the carpet layer and thermoplastic polymer layer was held constant and the foam properties were varied. The results are set forth in Table I.

TABLE I

| Sample | Density (pcf) | Pad Thickness mm | Resilience (percent) | Softness 25% IFD (pounds) | 160 HZ sound decay rate (dB/second) |
|---|---|---|---|---|---|
| Fiber Control 1 | 5 | 10 | — | — | 192 |
| Fiber Control 2 | 5 | 20 | — | — | 324 |
| Fiber Control 3 | 5 | 30 | — | — | 421 |
| A | 5 | 10 | — | soft (25) | 100 |
| B | 5 | 20 | — | soft (25) | 328 |
| C | 5 | 30 | — | soft (25) | 380 |
| D | 5 | 20 | — | soft (25) | 328 |
| E | 5 | 20 | — | medium (53) | 202 |
| F | 5 | 20 | — | firm (70) | 134 |
| G | 3 | 20 | — | soft (25) | 129 |
| H | 4 | 20 | — | soft (25) | 129 |
| I | 5 | 20 | — | soft (25) | 328 |
| J | 5 | 20 | 61 | soft (25.8) | 311 |
| K | 5 | 20 | 6 | — | 245 |
| L | 5 | 20 | 6 | soft | 190 |
| M | 5 | 20 | 6 | firm | 157 |
| N | 5 | 20 | 60 | firm (68) | 129 | more than about 70 pounds, preferably 20 to 50 pounds, and more desirably 20 to 40 pounds. The density should be from 3 to 10 pounds per cubic foot, and more desirably about 4 to 7 pounds per cubic foot. The above parameters are measured by the ANSI/ASTM D3574-77 standard method of testing flexible cellular materials—slab, bonded and molded urethane foams, Test H (resilience), Test B (indentation force deflection), and Test A (density).

The vibration damping characteristics of the carpet assembly may be evaluated by the Geiger Thick Plate test method, developed by Dr. P. H. Geiger and described in Geiger, P. H., Noise Reduction Manual, Engineering Research Institute, University of Michigan, 1953. In this well known test procedure a thick steel plate is vibrated to a predetermined frequency and a measurement is made of how long it takes for samples placed on the plate to stop the plate from vibrating once the frequency is discontinued. The results are expressed by a decay rate in decibels per second. The larger the decay rate, the better the vibration damping properties. Since lower frequencies are particularly troublesome in automotive applications and are difficult to eliminate, a test frequency of 160 HZ was used. Since the decay rate is affected not only by the nature of the vibration damping material, but also by the thickness of material present, for the test results to be meaningful they must be related to a particular thickness. The flexible resilient vibration damping foam cushion provides vibration damping properties to the carpet assemblies of the present invention of a magnitude such that no more than a 20 mm thickness of such foam imparts a sound decay rate at 160 HZ of at least 175 dB/second, and may typically exceed 200 dB/second. Thus, it is possible to achieve optimum acoustical properties from the carpet assembly with minimal thickness and weight.

EXAMPLE

The example which follows illustrates the desirable sound deadening properties of the carpet assemblies of the present invention. In this example, several foam-backed carpet assemblies in accordance with the inven- That which is claimed is:

1. A molded foam-backed sound deadening carpet assembly suitable for use in automobiles and characterized in that the foam cushion layer thereof is designed to provide enhanced sound deadening properties to the carpet assembly, said carpet assembly comprising
   a carpet having a fibrous surface on one face thereof and having a nonplanar three dimensional contoured configuration adapted to conform to the contours of the floor of an automobile;
   a moldable thermoplastic polymer layer covering the opposite face of said carpet and imparting moldability to the carpet for maintaining the carpet in said nonplanar three dimensional contoured configuration; and
   at least one flexible resilient foam cushion foamed in place on said thermoplastic polymer layer and bonded thereto, said at least one foam cushion extending over preselected areas less than the entire surface of said thermoplastic polymer layer, and said foam cushion having a 25% indentation force deflection (ASTM D3574 Test B) of no more than about 70 pounds, and a density of 3 to 10 pounds per cubic foot and providing vibration damping properties in said preselected areas of the carpet.

2. A carpet assembly according to claim 1 wherein said at least one foam cushion provides vibration damping properties to the carpet assembly of a magnitude such that no more than a 20 mm thickness of such foam imparts to the carpet assembly a sound decay rate at 160 HZ of at least 175 dB/second.

3. A carpet assembly according to claim 1 wherein said flexible foam cushion has a 25% indentation force deflection (ASTM D3574 Test B) of 20 to 50 pounds.

4. A carpet assembly according to claim 1 wherein said flexible foam cushion has a resilience (ASTM D3574 Test H) of 25 to 75 percent.

5. A carpet assembly according to claim 1 wherein said foam cushion has a thickness in certain areas which is different from that of adjacent areas of the cushion so as to better conform to the contours of the automobile floor.

6. A molded foam-backed sound deadening carpet assembly suitable for use in automobiles and characterized in that the foam cushion layer thereof is designed to provide enhanced sound deadening properties to the carpet assembly, said carpet assembly comprising a carpet having fibrous surface on one face thereof and having a nonplanar three dimensional contoured configuration adapted to conform to the contours of the floor of an automobile;

a moldable thermoplastic polymer layer covering the opposite face of said carpet and imparting moldability to the carpet for maintaining the carpet in said nonplanar three dimensional contoured configuration; and a flexible resilient foam cushion foamed in place on said thermoplastic polymer layer and bonded thereto, said foam cushion having a thickness in certain areas which is different from that of adjacent areas of the cushion so as to better conform to the contours of the automobile floor, and said foam cushion having a 25% indentation force deflection (ASTM D3574 Test B) of no more than about 70 pounds, a density of 3 to 10 pounds per cubic foot and providing vibration damping properties to the carpet assembly of such a magnitude that no more than a 20 mm thickness of such form imparts to the carpet assembly a sound decay rate at 160 HZ of at least 175 dB/second.

7. A carpet assembly according to claim 6 wherein said flexible foam cushion has a 25% indentation force deflection (ASTM D3574 Test B) of 20 to 50 pounds.

8. A carpet assembly according to claim 6 wherein said flexible foam cushion has a resilience (ASTM D3574 Test H) of 25 to 75 percent.

9. A carpet assembly according to claim 6 wherein said foam cushion includes a gradual transition in thickness interconnecting said areas of differing thickness.

10. A carpet assembly according to claim 6 wherein said foam cushion includes a step change in thickness interconnecting said areas of differing thickness.

11. A carpet assembly according to claim 6 wherein certain portions of said flexible foam cushion have an indentation force deflection and/or density different from that in other portions of said foam cushion.

12. A carpet assembly according to claim 1 or 6 wherein said flexible foam cushion is a polyurethane foam.

13. A carpet assembly according to claim 1 or 6 wherein said flexible foam cushion is of predominantly open cell structure and has a skin on its exposed surfaces.

14. A carpet assembly according to claim 1 or 6 wherein said thermoplastic polymer layer is present at about 0.1 to 1.0 pounds per square foot.

15. A carpet assembly according to claim 1 or 6 wherein said carpet comprises a tufted or woven carpet and the fibrous surface thereof is comprised of pile yarns.

16. A carpet assembly according to claim 1 or 6 wherein said carpet comprises a needled nonwoven carpet and the fibrous surface thereof is formed of nonwoven textile fibers.

17. A molded foam-backed sound deadening carpet assembly suitable for use in automobiles and characterized in that the foam cushion layer thereof is designed to provide enhanced sound deadening properties to the carpet assembly, said carpet assembly comprising a carpet having fibrous surface on one face thereof and having a nonplanar three dimensional contoured configuration adapted to conform to the contoours of the floor of an automobile;

a moldable thermoplastic polymer layer covering the opposite face of said carpet and imparting moldability to the carpet for maintaining the carpet in said nonplanar three dimensional contoured configuration; and at least one flexible resilient foam cushion foamed in place on said thermoplastic polymer layer and bonded thereto, said at least one foam cushion extending over preselected areas less than the entire surface of said thermoplastic polymer layer, and said foam cushion having a resilience (ASTM D3574 Test H) of at least 25 percent, a density of 3 to 10 pounds per cubic foot, and a 25% indentation force deflection (ASTM D3574 Test B) of 20 to 70 pounds, and providing vibration damping properties in said preselected areas of the carpet, and wherein the density and thickness of said thermoplastic polymer layer and of said flexible foam cushion are such that the carpet assembly has a weight of not more than about 1.1 pounds per square foot.

18. A carpet assembly according to claim 17 wherein said at least one foam cushion provides vibration damping properties to the carpet assembly of such a magnitude that no more than a 20 mm thickness of such foam imparts to the carpet assembly a sound decay rate at 160 HZ of at least 175 dB/second.

19. A molded foam-backed sound deadening carpet assembly suitable for use in automobiles and characterized in that the foam cushion layer thereof is designed to provide enhanced sound deadening properties to the carpet assembly, said carpet assembly comprising a carpet having a fibrous surface on one face thereof and having a nonplanar three dimensional contoured configuration adapted to conform to the contours of the floor of an automobile;

a moldable thermoplastic polymer layer covering the opposite face of said carpet and imparting moldability to the carpet for maintaining the carpet in said nonplanar three dimensional contoured configuration; and a flexible foam cushion bonded to said thermoplastic polymer layer, said flexible foam cushion having a thickness in certain areas which is different from that of adjacent areas of the cushion so as to better conform to the contours of the automobile, and said foam cushion having a resilience (ASTM D3574 Test H) of at least 25 percent, a density of 3 to 10 pounds per cubic foot, and a 25% indentation force deflection (ASTM D3574 Test B) of 20 to 70 pounds, and providing vibration and sound damping properties to the carpet assembly, and wherein the density and thickness of said thermoplastic polymer layer and of said flexible foam cushion are such that the carpet assembly has a weight of not more than about 1.1 pounds per square foot.

20. A molded foam-backed sound deadening carpet assembly suitable for use in automobiles and characterized in that the foam cushion layer thereof is designed to provide enhanced sound deadening properties to the carpet assembly, said carpet assembly comprising a carpet having a fibrous surface on one face thereof and having a nonplanar three dimensional contoured configuration adapted to conform to the contours of the floor of an automobile;

a moldable thermoplastic polymer layer covering the opposite face of said carpet and imparting moldability to the carpet for maintaining the carpet in said nonplanar three dimensional contoured configuration; and a flexible resilient foam cushion foamed in place on said thermoplastic polymer layer and bonded thereto, said flexible foam cushion having a thickness in certain areas which is different from that of adjacent areas of the cushion so as to better conform to the contours of the automobile, and said foam cushion having a resilience (ASTM D3574 Test H) of at least 25 percent, a density of 4 to 7 pounds per cubic foot, and a 25% indentation force deflection (ASTM D3574 Test B) of 20 to 40 pounds, and providing vibration and sound damping properties to the carpet assembly.

* * * * *

UNITED STATES PATENT AND TRADEMARK OFFICE
CERTIFICATE OF CORRECTION

PATENT NO. : 4,579,764
DATED : April 1, 1986
INVENTOR(S) : Clarence A. Peoples, Jr., Jacquelyn S. Hicks, and Vernon C. Smith It is certified that error appears in the above-identified patent and that said Letters Patent is hereby corrected as shown below:

In Claim 6, Column 9, Line 8, please insert "a" before --fibrous--.

In Claim 6, Column 9, Line 28, "form" should be --foam--.

In Claim 17, Column 10, Line 6, "contoours" should be --contours--.

Signed and Sealed this

Twenty-second Day of July 1986

[SEAL]

Attest:

DONALD J. QUIGG

Attesting Officer

Commissioner of Patents and Trademarks